United States Patent

[11] 3,602,118

| [72] | Inventor | Robert Oberheim<br>Neu Isenberg, Germany |
|---|---|---|
| [21] | Appl. No. | 733,892 |
| [22] | Filed | June 3, 1968 |
| [45] | Patented | Aug. 31, 1971 |
| [73] | Assignee | Braun Aktiengesellschaft<br>Frankfurt am Main, Germany |
| [32] | Priority | June 7, 1967 |
| [33] | | Germany |
| [31] | | B 92 896 TXa/57a |

[54] HOUSING FOR PHOTOGRAPHIC CAMERAS
18 Claims, 5 Drawing Figs.

[52] U.S. Cl. .................................................. 95/11, 95/40
[51] Int. Cl. .............................................. G03b 17/04, G03b 17/56
[50] Field of Search ............................................ 95/86, 11, 40; 353/17, 119; 752/242

[56] References Cited
UNITED STATES PATENTS

| 1,171,483 | 2/1916 | Turner ........................ | 95/86 |
| 2,043,968 | 6/1936 | Crumrine .................... | 95/40 X |
| 2,139,152 | 12/1938 | Freimann ..................... | 353/17 |
| 2,503,485 | 4/1950 | Hill ............................ | 95/86 |
| 2,926,573 | 3/1960 | Weiss ......................... | 95/86 X |
| 3,165,043 | 1/1965 | Wareham ..................... | 95/11 X |

FOREIGN PATENTS

| 583,512 | 9/1932 | Germany ..................... | 95/86 |

Primary Examiner—John M. Horan
Attorney—Michael S. Striker

ABSTRACT: The housing of a still camera comprises a body whose front wall carries the lens mount, shutter release trigger and certain other components and which further defines one or more chambers for one or more film magazines. A frame of the body is pivotally connected with a front cover which can be moved to closed position to overlie the front wall and a rear cover which can be moved to a closed position to overlie and to seal the chamber or chambers. Both covers are hingedly connected to a bottom portion of the frame and each thereof can be releasably coupled to the body in closed position. The front cover can be locked in open position in which it permits the operator to use the camera and this front cover can be completely separated from the body to afford access to a socket by means of which the body is connectable to a tripod.

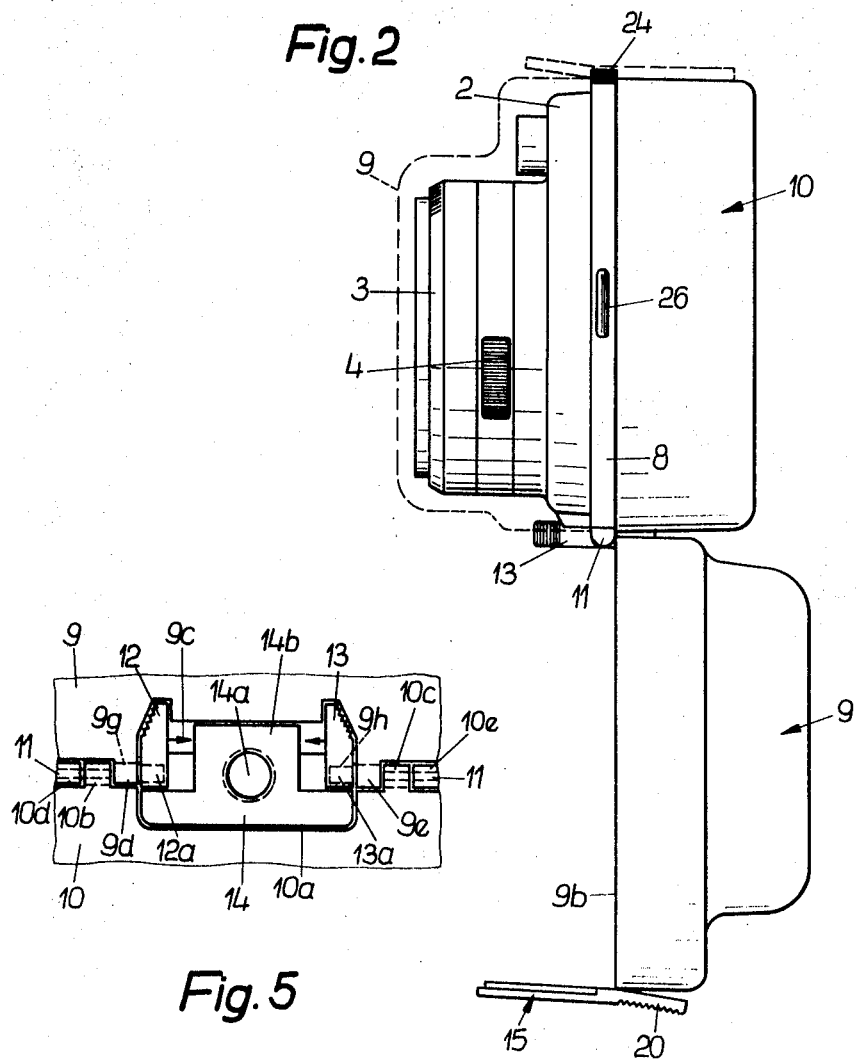

PATENTED AUG 31 1971 3,602,118

Inventor
Robert Clothern,
By Michael S. Striker
Attorney

HOUSING FOR PHOTOGRAPHIC CAMERAS

BACKGROUND OF THE INVENTION

The present invention relates to photographic cameras in general, and more particularly to improvements in housings for photographic cameras, especially to improvements in housings for still cameras.

Presently known still cameras normally comprise a housing wherein a rear or bottom wall is either pivotable to open position or is bodily separable from the remainder of the housing to permit insertion or removal of spools and/or film magazines or cartridges. The front wall of the housing which carries the lens mount and other parts of the camera is unprotected. Thus, a lens mount which projects well beyond the front wall of the housing is likely to be damaged if it strikes against a hard object, and the objective is likely to become smudged when the camera is not in use. It is therefore necessary to protect the housing by a carrying case of leather or plastic which is provided with a threaded bolt adapted to be received in an internally threaded socket of the housing. The front flap of the carrying case is pivotable and can be placed over the front and top walls of the housing to protect the lens mount and other sensitive parts when the camera is not in use. A drawback of such carrying cases is that they add considerably to the bulk of the camera, particularly because a conventional carrying case normally overlies the entire housing, i.e., also those parts of the housing which need little if any protection. Moreover, in most instances, the housing must be removed from the carrying case in order to permit reloading of the camera with fresh film. Valuable time is lost during removal and reinsertion of the housing into the carrying case.

SUMMARY OF THE INVENTION

It is an object of the present invention to provide a camera housing which can replace the carrying case and which occupies less room than a carrying case.

Another object of the invention is to provide a housing which protects all sensitive parts of the camera, particularly the lens mount and all such sensitive elements which are normally mounted on the front wall and are exposed in a conventional camera when the latter is removed from its carrying case.

A further object of the invention is to provide an eye-pleasing housing for still cameras and to construct and assemble the housing in such a way that it can be manipulated with little loss in time in order to protect the lens mount, to expose the lens mount and other parts on the front wall of the body, to expose one or more chambers for film spools or magazines, or to seal the chambers and the film therein against entry of dust, moisture and/or light.

An additional object of the invention is to provide a housing which can be produced of a variety of materials, which can protect the lens mount, the view finder, the exposure meter, the release trigger and/or other sensitive parts at least as well or better then a conventional carrying case, and which is designed to enable the user to rapidly set the camera for one or more exposures or to place the camera in condition for storage or nonuse in which condition the sensitive parts are fully protected against shock, impact, dust, moisture, entry of light and/or other undesirable influences.

In its presently preferred form, the housing comprises a body having a front wall which supports the lens mount and one or more additional components of the camera (for example, the front lens of the view finder, a window in front of the exposure meter, a shutter release trigger, a range finder window, an automatic shutter release and/or others), and a front cover movable between closed and open positions in the first of which it overlies and conceals the front wall and the lens mount and in the second of which it exposes the front wall and enables the operator to use the camera in the customary way. The body preferably comprises a rectangular frame located in the central vertical plane of the housing and the front cover is hingedly connected to the bottom portion of the frame so that it must be pivoted upwardly in order to move to closed position. A similar second or rear cover is preferably provided to normally cover one or more film-receiving chambers in the rear portion of the body, and the two covers can be arranged to pivot about a common axis.

In accordance with another feature of the invention, the front cover can be releasably locked in open position and in closed position and it can be bodily separated from the remainder of the housing on movement to open position to afford convenient access to a socket which can receive the customary plug of a tripod.

The novel features which are considered as characteristic of the invention are set forth in particular in the appended claims.

The improved camera housing itself, however, both as to its construction and its mode of operation, together with additional features and advantages thereof, will be best understood upon perusal of the following detailed description of a specific embodiment with reference to the accompanying drawing.

BRIEF DESCRIPTION OF THE DRAWING

FIG. 2 is a side elevational view of the camera, the closed position of the front cover being indicated by broken lines;

FIG. 5 is a fragmentary sectional view of the top part of the camera housing, with the coupling between the front cover and the body shown in operative and inoperative positions.

DESCRIPTION OF THE PREFERRED EMBODIMENT

Figure 1:
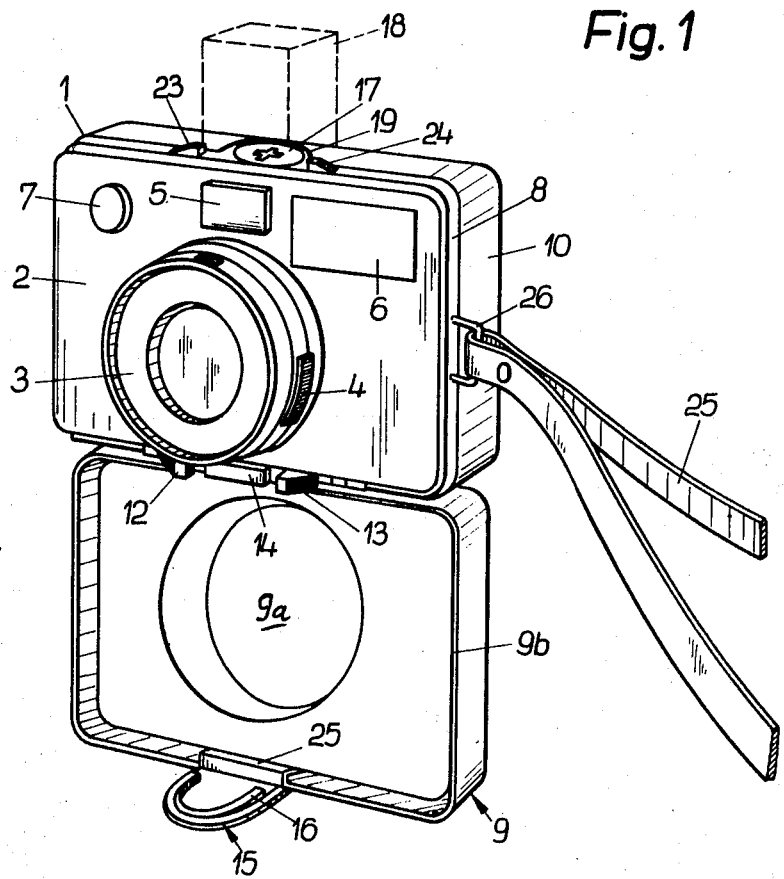
FIG. 1 is a perspective view of a portable still camera whose housing embodies the invention, the front cover being shown in open position.
Figure 3:
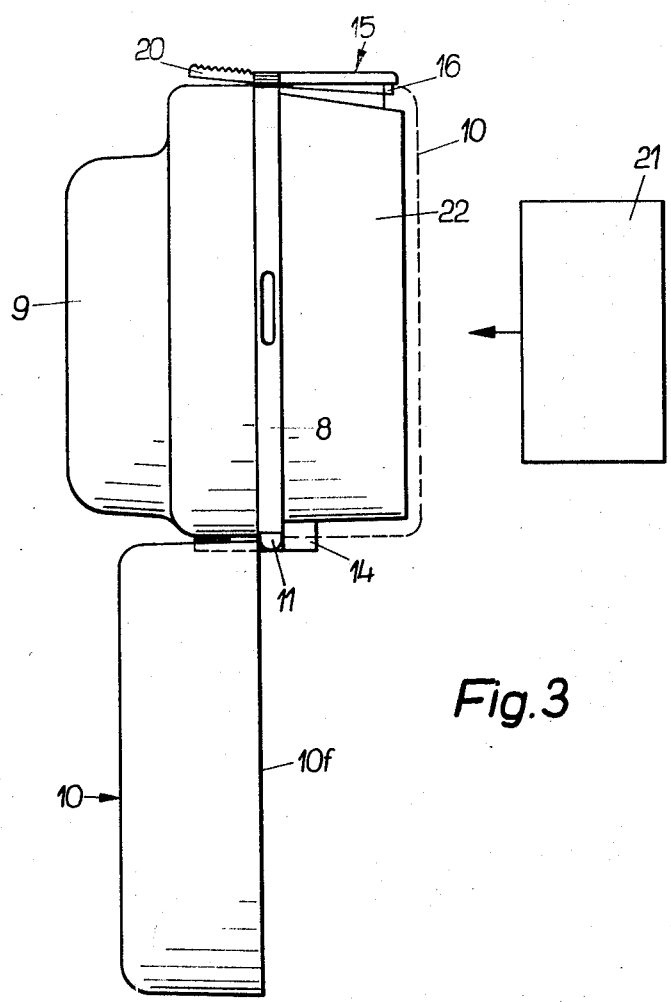
FIG. 3 is a similar side elevational view of the camera, the front and rear covers of the housing being respectively shown in closed and open positions and the closed position of the rear cover being indicated by broken lines.

FIG. 1 illustrates a portable still camera whose housing includes a main portion or body 1 having a front wall 2 which supports a lens mount 3 carrying one or more rings 4 for selection of exposure times, aperture sizes and/or other factors which affect the exposure. The front wall 2 also carries the window 5 of a view finder, a window 6 located in front of a built-in automatic exposure meter and a shutter release trigger 7. The body 1 further includes a rectangular frame 8 which is located substantially centrally of the housing and supports a front cover 9 and a rear cover 10. These covers resemble caps and are pivotally connected to the frame 8 so as to be movable between open and closed positions. Depending on the axial length of the lens mount 3, the major panel of the front cover 9 may be provided with a recess 9a which accommodates a portion of the lens mount when the cover 9 is moved to the closed position shown in FIG. 3. As shown in FIG. 2 by broken lines, the front cover 9 extends only slightly beyond the lens mount 3 and front wall 2 when it is moved to closed position so that it adds very little to the bulk of the camera. When moved to such closed position, the front cover 9 overlies not only the front wall 2 and the parts mounted in or on this wall, but also the narrow side, top and bottom face of the body 1 all the way to the frame 8 so as to prevent entry of dust and/or moisture. In other words, the edges 9b of the front cover 9 can be moved into abutment with the frame 8 to provide a substantially dustproof enclosure for the lens mount 3 and for other parts shown on the front wall 2. The front cover 9 is rigid enough to protect the lens mount and other parts on the front wall 2 against pressure, shock, impact and other damage.

The connecting means which couples the front cover 9 to the frame 8 for pivotal movement about a horizontal axis 11 which extends across the bottom portion 14 of the frame is preferably designed to automatically arrest the front cover in the fully open position shown in FIG. 1 or 2. This is desirable to prevent swinging of the front cover when the camera is in use. The frame 8 and the front cover 9 are further provided with cooperating coupling members which can releasably hod the front cover in closed position. Still further, the aforementioned connecting means between the bottom portion 14 of the frame 8 and the front cover 9 is preferably designed in such a way that it allows for complete detachment of the front cover. The latter then affords convenient access to an internally threaded socket 14a provided in the bottom portion 14 of the frame 8 and serving to accommodate the threaded plug of a customary tripod on which the camera is mounted when the exposure time necessary for a satisfactory exposure is longer than that which warrants the making of exposures with the camera held by hand. As a rule, exposures with exposure times longer than one-thirtieth of a second should be made with the camera a mounted on a tripod.

Referring to FIG. 5, the bottom portion of the front cover 9 is provided with a cutout 9c which exposes part of the bottom portion 14 of the frame 8 and can accommodate two disengaging members 12, 13 which are rigid with two coaxial sockets 12a, 13a. The bottom portion of the front wall 9 is further provided with two coaxial eyes 9d, 9e for two pintles 9f, 9g which extend toward each other and can enter the sockets 12a, 13a when the disengaging members 12, 13 are moved away from each other to assume the operative positions shown in FIG. 5. When the disengaging members 12, 13 are moved toward each other as indicated by arrows, they move their sockets 12a, 13a away from the pintles 9g, 9h and permit complete separation of the front cover 9 from the body 1.

In accordance with a presently preferred embodiment of the invention, the disengaging members 12, 13 automatically remain in their inoperative positions (in which their sockets 12a, 13a are moved away from the corresponding pintles 9g, 9h) as long as the front cover 9 remains separated from the body 1. This can be achieved automatically, i.e., the members 12, 13 are locked in their inoperative positions in response to separation of the front cover 9 and are unlocked to be returnable to the operative positions shown in FIG. 5 when the front cover 9 is returned to a position in which its pintles 9g, 9h register with the sockets 12a, 13a. Springs 12b, 13b may be provided to permanently bias the disengaging members 12, 13 to their operative positions. The means for locking the members 12, 13 in inoperative positions may comprise inserts of magnetizable material embedded in the members 12, 13 and a permanent magnet 14b in the bottom portion 14 of the frame 8. When the inserts are moved sufficiently close to the magnet 14b, the latter attracts the disengaging members 12, 13 and holds them against the bias of the springs 12b, 13b. In order to separated the members 12, 13 from the magnet 14b, the operator exerts a slight pressure which suffices to overcome the attraction between the inserts and the magnet and to permit the springs 12b, 13b to return the members 12, 13 to the operative positions shown in FIG. 5 whereby the pintles 9g, 9h automatically penetrate into the corresponding sockets 12a, 13a if the front cover 9 is properly positioned with reference to the body 1. Other means for locking the disengaging members 12, 13 in inoperative positions can be used just as well; as stated before, such locking means may respond automatically to the separation and return movement of the cover 9 to the position shown in FIG. 5. Locking of the disengaging members 12, 13 in inoperative positions is desirable because the user need not move these members to inoperative positions while manipulating the cover 9 and the body 1 in order to move the sockets 12a, 13a into requisite alignment with the pintles 9g, 9h. The means for yieldably holding the front cover 9 in open position may comprise one or more spring-biased detent balls or the like.

Figure 4:
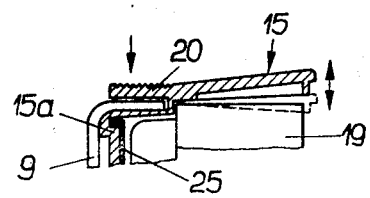
FIG. 4 is a fragmentary bottom plan view of the camera, with the front and rear covers shown in closed positions.

The aforementioned coupling means between the cover 9 and frame 8 comprises an elastically deformable coupling element 15 which is provided on the top portion of the front cover and a complementary coupling element 19 (FIG. 4) provided on the frame 8. In the illustrated embodiment, the coupling element 19 serves as a receptacle for an indexible socket 17 which forms part of a built-in flash unit and can receive a so-called flashcube or an analogous multiple-flashbulb holder 18 or a single flashbulb (not shown). The underside of the coupling element 15 has a suitably configurated rib 16 which can surround the coupling element 19 when the front cover 9 is moved to closed position and which preferably snaps into engagement with the coupling element 19 due to innate elasticity of the coupling element 15. The latter has a leg 15a which extends along the inner side of the front cover 9 and is secured thereto by adhesive, by a rivet or in another suitable way. The leg 15a is covered by a jacket 25 of preferably elastic material which coats a portion of or the entire inner side of the front cover 9. The inclination of the leg 15a with reference to the plane of the rib 16 is preferably such that the coupling element 15 tends to pivot in a clockwise direction, as viewed in FIG. 4, and to move the rib 16 into engagement with the coupling element 19 when the front cover 9 is moved to closed position. In order to disengage the rib 16 from the element 19, the user exerts a slight pressure against the left-hand arm 20 of the element 15 as indicated by arrow shown in FIG. 4. The arm 20 is preferably serrated. When the rib 16 engages the coupling element 19, the arm 20 is slightly spaced from the adjoining portion of the external surface on the front cover 9.

The rear cover 10 is preferably mounted on the frame 8 for pivotal movement independently of the front cover 9. When in open position (shown in FIG. 3 by solid lines), the rear cover 10 exposes one or two chambers 22 in the body 1 for insertion or removal of one or more film magazines or cartridges 21. A single chamber suffices if the camera is designed to utilize magazines of the type having a film storing portion connected with a takeup portion so that the exposed film need not be rewound on the supply reel. If the camera uses discrete supply cartridges and discrete takeup reels, the body 1 will be formed with two chambers.

As shown in FIG. 5, the covers 9 and 10 are pivotable about the common axis 11. However, the rear cover 10 need not (but can) be separated from the frame 8. The connecting means for coupling the rear cover 10 to the bottom portion 14 of the frame 8 is located at the opposite sides of a recess 10a in the rear cover 10 and comprises aligned pairs of eyes 10b, 10c and 10d, 10e respectively provided on the cover 10 and frame 8 and pintles which extend through the eyes 10b, 10d and 10c, 10e. The provision of a common pivot axis 11 for the covers 9 and 10 simplifies the construction of hinges and renders it possible to reduce the width of the frame 8 to a minimum and to thus enhance the appearance of the housing. Still further, such mounting of the hinges renders it possible to fully expose the front wall 2 and the chamber or chambers 22 when the respective cover is moved to the open position. The edges 10f of the rear cover 10 abut against the frame 8 to seal the chamber or chambers 22 against entry of light when the rear cover is moved to closed position. The coupling means for releasably holding the rear cover 10 in closed position comprises two coupling members 23, 24 which can be moved toward each other to release the rear cover and are biased by springs (not shown) to move apart and to thereby hold the rear cover in closed position. These coupling members 23, 24 are mounted on the frame 8 at the opposite sides of the coupling element 19.

The covers 9 and 10 preferably consist of synthetic plastic material which is resistant to impacts and can stand extensive wear. In accordance with a presently preferred embodiment, each of the covers 9, 10 comprises a core or main body portion of relatively hard and rigid synthetic plastic material and an outer coat of relatively soft elastic material. The soft outer coat provides for a firm grip and the hard core ensures satisfactory resistance to impacts in the event that the housing is dropped or that the operator bumps the cover 9 or 10 against a hard object.

The frame 8 is provided with an eye 26 for a strap 25 of leather or plastic. The strap can be placed around the wrist of one hand and can remain in such position when the camera is in use, i.e., when the front cover 9 is removed or is held in the open position shown in FIG. 1. This insures that the camera cannot be accidentally dropped by a clumsy careless person. Furthermore, when the camera is not in sure, the fingers of the hand carrying the strap 25 remain free.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a still camera, particularly in a portable still camera, a combination comprising a rigid tubular lens mount; and a housing including a body defining at least one chamber for photographic film and having a front wall supporting said lens mount so that the lens mount permanently extends forwardly beyond said front wall, a first cover normally sealing said chamber against entry of light, a front cover pivotable with reference to said front wall through an angle exceeding 90° between a closed position in which said front cover at least substantially overlies said front wall and conceals and protects said lens mount and an open position in which said front wall and said lens mount are exposed and the front cover does not extend forwardly beyond said lens mount, said front cover having a portion which at least substantially conforms to the outline of the lens mount in the closed position of said front cover; and means for releasably maintaining said front cover in open position.

2. A combination as defined in claim 1, wherein said first cover is a rear cover and is movable with reference to said body between a closed position in which it seals said chamber and an open position in which it affords access to said chamber.

3. A combination as defined in claim 2, wherein each of said covers is a cap and wherein said body includes a substantially centrally located frame, and further comprising connecting means articulately coupling said covers to said frame.

4. A combination as defined in claim 3, wherein said connecting means defines a common pivot axis for said covers.

5. A combination as defined in claim 4, wherein said frame comprises a bottom portion and said connecting means couples said covers to said bottom portion.

6. A combination as defined in claim 4, wherein said covers are pivotable upwardly to said closed positions and downwardly from their respective closed positions.

7. A combination as defined in claim 1, further comprising connecting means articulately and separably coupling said front cover to said body.

8. A combination as defined in claim 1, wherein said last-mentioned means cooperates with said connecting means.

9. A combination as defined in claim 7, wherein said connecting means comprises a pair of coaxial pintles provided on said front cover, and a pair of sockets supported by said body and defining coaxial bores normally receiving said pintles, at least one of said sockets being movable with reference to said body from an operative position to thereby shift its bore away from the respective pintle.

10. A combination as defined in claim 9, further comprising means for biasing said one socket to operative position.

11. A combination as defined in claim 9, further comprising means for holding said one socket away from operative position on separation of said front cover from the body.

12. A combination as defined in claim 11, further comprising resilient means operative to move said one socket back to operative position in response to reattachment of said front cover to said body.

13. A combination as defined in claim 1, further comprising coupling means for releasably holding said front cover in closed position.

14. A combination as defined in claim 13, wherein said coupling means comprises an elastically deformable coupling element provided on said front cover and a complementary coupling element provided on said body.

15. A combination as defined in claim 14, wherein said complementary coupling element constitutes a support for separable auxiliary equipment of the camera.

16. A combination as defined in claim 2, wherein said covers are caps and comprise edge portions which abut against a frame of said body in said closed positions thereof.

17. A combination as defined in claim 1, wherein at least one of said covers comprises a main body portion of relatively rigid material and an outer coat of relatively soft material.

18. In a still camera, particularly in a portable still camera, a combination comprising a rigid tubular lens mount; and a housing including a body defining at least one chamber for photographic film and having a front wall supporting said lens mount, a first cover normally sealing said chamber against entry of light, and a front cover pivotable with reference to said front wall through an angle exceeding 90° between a closed position in which said front cover at least substantially overlies said front wall and conceals and protects said lens mount and an open position in which said front wall and said lens mount are exposed and the front cover does not extend forwardly beyond said lens mount.